(12) United States Patent
Ikeda

(10) Patent No.: US 12,485,908 B2
(45) Date of Patent: Dec. 2, 2025

(54) CONTROL APPARATUS

(71) Applicant: SUBARU CORPORATION, Tokyo (JP)

(72) Inventor: Shunsuke Ikeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 278 days.

(21) Appl. No.: 18/136,945

(22) Filed: Apr. 20, 2023

(65) Prior Publication Data

US 2023/0347913 A1 Nov. 2, 2023

(30) Foreign Application Priority Data

Apr. 28, 2022 (JP) .................................. 2022-074624

(51) Int. Cl.
*B60W 50/02* (2012.01)
*B60W 50/14* (2020.01)

(52) U.S. Cl.
CPC ........ *B60W 50/0205* (2013.01); *B60W 50/14* (2013.01); *B60W 2050/143* (2013.01); *B60W 2050/146* (2013.01); *B60W 2510/24* (2013.01); *B60W 2510/28* (2013.01)

(58) Field of Classification Search
CPC ..... B60W 2050/143; B60W 2050/146; B60W 2510/24; B60W 2510/28; B60W 50/0205
See application file for complete search history.

(56) References Cited

U.S. PATENT DOCUMENTS

2018/0197029 A1* 7/2018 Ali .......................... G06V 20/59
2021/0061170 A1* 3/2021 Krishnaswamy ...... B60Q 5/005

FOREIGN PATENT DOCUMENTS

| JP | 2018-154247 A | 10/2018 |
| JP | 2021-78214 A | 5/2021 |

* cited by examiner

*Primary Examiner* — Charles J Han
(74) *Attorney, Agent, or Firm* — TROUTMAN PEPPER LOCKE LLP

(57) ABSTRACT

A control apparatus to be mounted on a vehicle includes one or more processors, and one or more memories each storing a program to be executed by the one or more processors. The program includes one or more commands. The one or more commands are each configured to cause the one or more processors to: determine whether the vehicle is in an enclosed environment; and execute abnormality notification control to output an abnormality notification based on a result of a power-source-state determination and a result of a presence determination when the one or more processors determine that the vehicle is in the enclosed environment. The power-source-state determination is a determination regarding a state of a power source of the vehicle, and the presence determination is a determination as to whether there is a person inside or outside the vehicle.

13 Claims, 6 Drawing Sheets

CONTROL APPARATUS

CROSS-REFERENCE TO RELATED APPLICATION

The present application claims priority from Japanese Patent Application No. 2022-074624 filed on Apr. 28, 2022, the entire contents of which are hereby incorporated by reference.

BACKGROUND

The disclosure relates to a control apparatus.

A mobile body such as a vehicle includes, for example, an engine, a battery, or a hydrogen fuel as a power source. As commonly known, exhaust gas emitted from a gasoline engine includes a gas harmful to human bodies, such as carbon monoxide.

A battery mounted on a vehicle is, for example, a lithium-ion battery. A lithium-ion battery can cause a malfunction due to a manufacturing defect or a control defect, which can result in generation of gas. The gas can include various components including carbon monoxide, carbon dioxide, hydrogen, hydrogen fluoride, and hydrogen sulfide some of which can be harmful to human bodies.

A fuel cell including a hydrogen gas can cause leakage of the hydrogen gas. Further, an engine using a synthetic fuel called e-fuel emits hydrogen and carbon dioxide, for example. Hydrogen and carbon dioxide themselves have low possibility of adversely affecting human bodies; however, a large amount of hydrogen and carbon dioxide can reduce oxygen concentrations and adversely affect human bodies.

Under these circumstances, existing vehicles are taking countermeasure against these concerns about gas. For example, Japanese Unexamined Patent Application Publication (JP-A) No. 2021-78214 discloses a technique to detect smoke generated from a battery of a vehicle by a gas sensor. Further, JP-A No. 2018-154247 discloses a technique to measure the concentration of a harmful gas included in the exhaust gas emitted from an internal combustion engine and discharge the exhaust gas to outside the vehicle if the concentration is high.

SUMMARY

An aspect of the disclosure provides a control apparatus to be mounted on a vehicle. The control apparatus includes one or more processors and one or more memories each storing a program to be executed by the one or more processors. The program includes one or more commands. The one or more commands are each configured to cause the one or more processors to: determine whether the vehicle is in an enclosed environment; and execute abnormality notification control to output an abnormality notification based on a result of a power-source-state determination and a result of a presence determination when the one or more processors determine that the vehicle is in the enclosed environment. The power-source-state determination is a determination regarding a state of a power source of the vehicle, and the presence determination is a determination as to whether there is a person inside or outside the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Techniques disclosed in JP-A Nos. 2021-78214 and 2018-154247 involve multiple gas sensors to detect different gases generated by a battery, for example. This can increase manufacturing costs.

A person in an open environment such as an outdoor space hardly inhales carbon monoxide or other harmful gases in an amount that adversely affects his/her body. However, a person outside a vehicle in an enclosed environment without a gas exhaust port such as an enclosed garage, an underground parking space, or a snowfall environment can inhale exhaust gas emitted from the vehicle in a larger amount than usual. Although a driver or an occupant inside a vehicle has to be aware of being in an enclosed environment, they cannot be aware of being in the enclosed environment when being concentrated in driving or other things. For example, while the driver or occupant is having a nap in the vehicle, they cannot be aware of being in an enclosed environment due to snowfall, for example.

It is desirable to provide a control apparatus that makes it possible to reduce an adverse effect of gas generated from a vehicle on human bodies.

Figure 1:
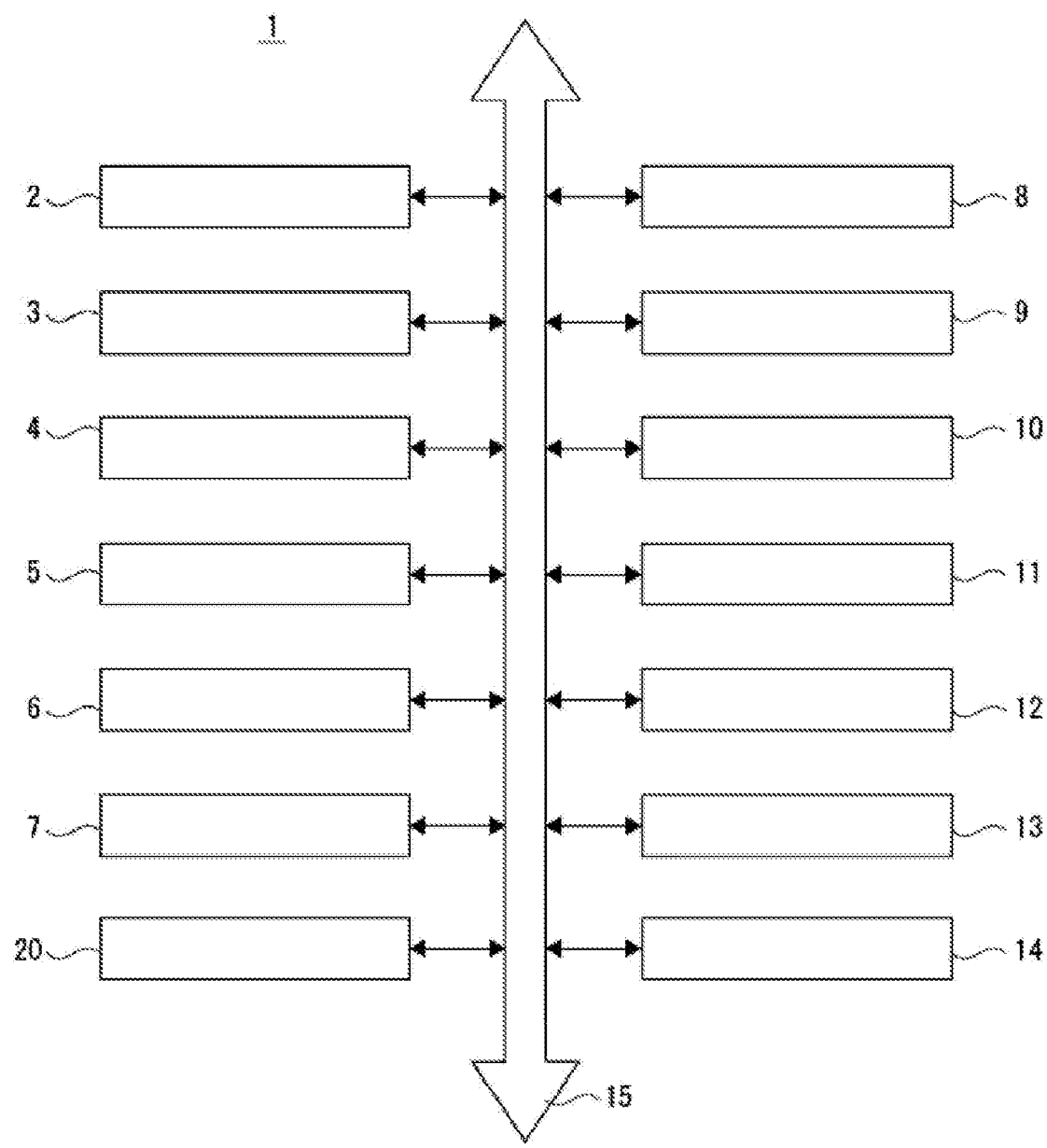
FIG. 1 is a block diagram illustrating an exemplary control configuration in a vehicle according to one example embodiment of the disclosure.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. FIG. 1 illustrates an exemplary control configuration according to an example embodiment mounted on a vehicle 1.

The vehicle 1 may include a hybrid electric vehicle (HEV) control processor 2, an engine control processor 3, a motor control processor 4, a transmission control processor 5, a steering control processor 6, a brake control processor 7, a position information processor 8, an air-conditioning (A/C) control processor 9, a power source sensor unit 10, an inside-vehicle sensor unit 11, an outside-vehicle sensor unit 12, a communicator 13, a notification unit 14, a bus 15, and a maintaining control processor 20, for example.

The vehicle 1 may be, for example, an engine vehicle using gasoline as a fuel, a hybrid electric vehicle (HEV) including an engine and a motor, an electric vehicle including a motor for traveling, a fuel cell electric vehicle, or an engine vehicle using a synthetic fuel manufactured by synthesizing carbon dioxide and hydrogen. The configuration example illustrated in FIG. 1 is given on the assumption that the vehicle 1 is a HEV. However, the vehicle 1 according to an example embodiment of the disclosure is not limited to an HEV and may be any type of vehicle described above. It should be understood that some components illustrated in FIG. 1 may not be provided depending on the type of the vehicle 1. For example, in a case where the vehicle 1 is an electric vehicle or a fuel cell electric vehicle, the HEV control processor 2 and the engine control processor 3 may not be provided. In a case where the vehicle 1 is an engine vehicle, the HEV control processor 2 and the motor control processor 4 may not be provided. Reference should be made to FIG. 1 in terms of the components of the vehicle 1 of various types in view of these points.

The HEV control processor 2, the engine control processor 3, the motor control processor 4, the transmission control processor 5, the steering control processor 6, the brake control processor 7, the position information processor 8, the A/C control processor 9, and the maintaining control processor 20 may each include a microcomputer, and may be coupled to each other via a bus 15 so that data communication is available between these components. The microcomputer may include a central processing unit (CPU), a read only memory (ROM), and a random access memory (RAM), for example.

The HEV control processor 2 may control an operation of the vehicle 1 by sending respective commands based on a required driving force to the engine control processor 3 and the motor control processor 4. For example, the HEV control processor 2 may calculate, based on the required driving force, a required engine driving force required by the engine and a required motor driving force required by the motor generator, and may send a driving command based on the required engine driving force to the engine control processor 3, and may send a driving command based on the required motor driving force to the motor control processor 4.

The engine control processor 3 may control, based on the required engine driving force, various actuators provided as engine-related actuators. Examples of the engine-related actuators may include various actuators relevant to engine driving such as a throttle actuator that drives a throttle valve, and an injector that performs fuel injection. The engine control processor 3 may control, based on the required engine driving force, a fuel injection timing, a fuel injection pulse width, and a throttle opening, for example, to thereby control an engine output. Further, the engine control processor 3 may be configured to perform control to start and stop the engine.

The motor control processor 4 may control, based on the required motor driving force, an operation of the motor generator by controlling a motor driving unit. The motor driving unit may be electric circuitry including a drive circuit of the motor generator. When the motor generator is to perform power running, the motor control processor 4 may send the motor driving unit a command based on the required motor driving force to cause the motor generator to perform the power running. When the motor generator is to perform regenerative rotation, the motor control processor 4 may send the motor driving unit a command based on the required motor driving force to cause the motor generator to perform the regenerative rotation. Further, the motor control processor 4 may regulate an output of the motor generator based on information including a state of charge (SOC) of a battery for traveling provided in the vehicle 1 as a power source of the motor generator.

The transmission control processor 5 may control various actuators provided as transmission-related actuators based on detection signals received from predetermined sensors provided in the vehicle 1 or operational information inputted using operators provided in the vehicle 1, for example. Examples of the transmission-related actuators may include a transmission actuator that performs transmission control of an automatic transmission of the vehicle 1 and a forward/backward movement changeover actuator that controls an operation of a forward/backward movement changeover mechanism.

The steering control processor 6 may perform driving control of a steering actuator (e.g., a power steering motor or another actuator configured to change a steering angle) based on a steering operation performed by a driver who drives the vehicle 1 to thereby control the steering angle.

The brake control processor 7 may control various actuators provided as brake-related actuators based on detection signals received from the predetermined sensors provided in the vehicle 1 or operational information inputted using the operators provided in the vehicle 1, for example. Examples of the bake-related actuators may include a hydraulic control actuator that controls the pressure of a fluid outputted from a brake booster to a master cylinder and the pressure of a fluid in a brake fluid pipe.

The position information processor 8 may perform a process of identifying a position of the vehicle 1. For example, the position information processor 8 may acquire latitude/longitude information on the vehicle 1 from the global navigation satellite system (GNSS) to determine a current position of the vehicle 1. Further, the position information processor 8 may determine an environment around the current position of the vehicle 1 by referring to map information based on the information on the current position of the vehicle 1. For example, the position information processor 8 may determine which region the current position of the vehicle 1 belongs to, out of on a road, inside a tunnel, an indoor parking space, a home garage, and an outdoor parking space, for example.

The A/C control processor 9 may cool or heat the internal space of the vehicle 1 by controlling components of an air conditioning (A/C) system, such as a compressor that compresses the air, an expansion valve, or a blower fan. Further, the A/C control processor 9 may switch the A/C system between an external air introduction mode and an internal air circulation mode automatically or in accordance with an operation performed by an occupant in the vehicle 1, for example.

The power source sensor unit 10 may be a sensor that detects a state of the power source. The term "power source" used in this example embodiment refers to a power source for traveling, such as an engine, or a motor and a battery for traveling. For example, the power source sensor unit 10 may detect a driving-on state and a driving-off state of an engine, and may send a detection signal to the maintaining control processor 20. Alternatively, the power source sensor unit 10 may detect a state of a battery, and may send a detection signal to the maintaining control processor 20. To detect the state of the battery, the power source sensor unit 10 may include a battery voltage sensor, a temperature sensor, and a motor current sensor, for example. Detection signals indicating, for example, a battery charged voltage, a voltage per battery block, a battery temperature, and an electric current state that have been detected by these sensors may be sent to the maintaining control processor 20.

The inside-vehicle sensor unit 11 may be a sensor that detects the presence or absence an occupant inside the vehicle 1 and the state of the occupant, for example. For example, the inside-vehicle sensor unit 11 may include one or more cameras that capture an image of the interior of the vehicle 1, and may send an image signal of the captured image to the maintaining control processor 20. That is, the inside-vehicle sensor unit 11 may include one or more cameras that serve as a driver monitoring system. The inside-vehicle sensor unit 11 may further include, for example, a weight sensor or a contact sensor in addition to or in place of the camera(s). The weight sensor or the contact sensor may be provided on an occupant's seat. The inside-vehicle sensor unit 11 may further include a sensor that detects the presence of an occupant and a movement of the occupant, such as an infrared sensor.

The inside-vehicle sensor unit 11 may further include sensors relating to various kinds of equipment inside the vehicle 1. For example, the inside-vehicle sensor unit 11 may include a sensor that detects opening and closing of a window of the vehicle 1, and a sensor that detects opening and closing of a door of the vehicle 1.

The outside-vehicle sensor unit 12 may include a sensor that detects an external environment of the vehicle 1. For example, the outside-vehicle sensor unit 12 may include one or more cameras that capture an image of the external environment of the vehicle 1, and may send an image signal of the captured image to the maintaining control processor 20. The one or more cameras may be used to capture a 360-degree image around the vehicle 1, or may be used to capture an image of a part in the vicinity of a muffler of the vehicle 1 in a case where the vehicle 1 is an engine vehicle, for example. The outside-vehicle sensor unit 12 may further include a sensor such as a millimeter-wave radar or a LiDAR. The outside-vehicle sensor unit 12 may further include an outside air temperature sensor, a humidity sensor, or an illuminance sensor.

The communicator 13 may be a radio communication processor configured to establish radio communication with an external facility of the vehicle 1. For example, the communicator 13 may communicate with a server apparatus of the external facility of the vehicle 1 via a communication network such as the Internet, for example. The communicator 13 may establish a telematics service communication, for example. The communicator 13 may further establish a radio communication as an intervehicle communication.

The notification unit 14 may output a notification to inside or outside the vehicle 1. The notification unit 14 may serve as a display unit that outputs a notification to inside the vehicle 1 by displaying a notification on a display disposed on a front console of the vehicle 1, for example. Alternatively, the notification unit 14 may serve as a sound output unit that outputs, for example, a notification sound or a voice message to inside the vehicle 1. The notification unit 14 may serve as a sound output unit that outputs a notification to outside the vehicle 1 by outputting a notification sound or a voice message in a relatively large volume. Alternatively, the notification unit 14 may be a light emitting unit that outputs a notification in the form of light emission patterns to outside the vehicle 1.

The maintaining control processor 20 includes one or more processors. The maintaining control processor 20 execute a predetermined maintaining process to gas generated from the power source in accordance with a command in a program stored in one or more memories. In one embodiment, the maintaining control processor 20 may serve as a "control apparatus".

For example, the maintaining control processor 20 may receive information on the current position of the vehicle 1 and the region that the current position of the vehicle 1 belongs to, from the position information processor 8, and may use the information in the predetermined maintaining process. The maintaining control processor 20 may further cause the communicator 13 to establish a communication based on the position information to thereby acquire weather information relating to the current position of the vehicle 1.

The maintaining control processor 20 may receive the detection information on the engine or the battery from the power source sensor unit 10, and may use the information in a predetermined maintaining process. For example, the maintaining control processor 20 may perform a process of detecting a driving duration time of the engine and a malfunction of the battery.

The maintaining control processor 20 may receive the image signal of the image of the interior of the vehicle 1 captured by the camera(s) of the inside-vehicle sensor unit 11 and information acquired by various sensors, and may use the image signal and the information in a predetermined maintaining process. The maintaining control processor 20 may perform an image analyzing process based on the image signal received from the camera(s) to determine the presence or absence of an occupant and a movement of the occupant. Further, the maintaining control processor 20 may determine the presence or absence of an occupant and a movement of the occupant, based on the information received from the weight sensor or the contact sensor of the inside-vehicle sensor unit 11. The maintaining control processor 20 may further determine an opening state or a closing state of a door, a window, or an external air introduction port of the vehicle 1 based on the detection information received from the sensors of the inside-vehicle sensor unit 11 or the information regarding the external air introduction mode or the internal air circulation mode received from the A/C control processor 9.

Further, the maintaining control processor 20 may receive the image signal of the image of the external environment of the vehicle 1 captured by the camera(s) of the outside-vehicle sensor unit 12 and information acquired by various sensors, and may use the image signal and the information in a predetermined maintaining process. The maintaining control processor 20 may perform an image analyzing process based on the image signal received from the camera(s) to determine the surrounding environment of the vehicle 1, the presence or absence of a person around the vehicle 1, and a movement of the person, for example. To make these determinations, the maintaining control processor 20 may also use information received from other sensors such as an outside air temperature sensor.

The maintaining control processor 20 may make these determinations, and may cause the notification unit 14 to output a notification to inside or outside the vehicle 1 based on the results of the determinations. The maintaining control processor 20 may further cause the communicator 13 to establish a necessary communication based on the results of the determinations. The above-described determinations and control performed by the maintaining control processor 20 are described in detail below.

The maintaining control processor 20 may determine whether the vehicle 1 is in an enclosed environment. Now, a description is given of the enclosed environment assumed in the example embodiment.

Herein, the term "enclosed environment" refers to an environment in which the entire or part of the vehicle 1 is in an enclosed space relatively narrow. The phrase "space relatively narrow" refers to such a narrow space that can adversely affect a human body when being filled with gas such as exhaust gas. The phrase "the entire or part of the vehicle 1 is in an enclosed space" refers to a state in which the vehicle 1 is in an enclosed space that can adversely affect a human body when being filled with gas such as exhaust gas, and the enclosed space is not necessarily completely enclosed. For example, the phrase also refers to a state in which a part in the vicinity of a muffler of an engine vehicle is enclosed.

Figure 2:
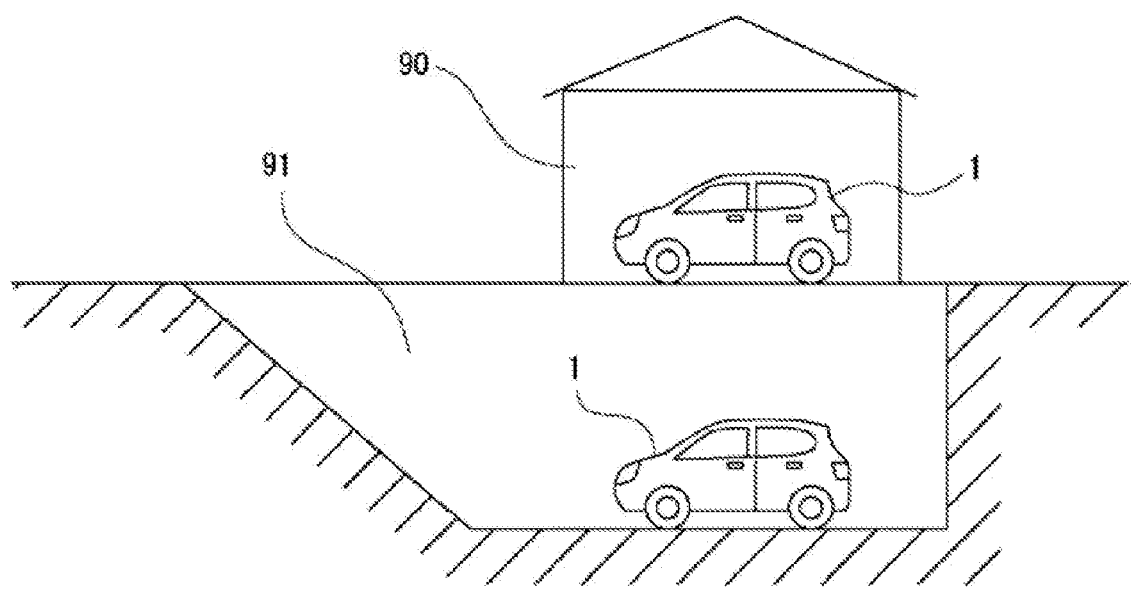
FIG. 2 is a diagram illustrating an example of an enclosed environment.

According to the present example embodiment, when the vehicle 1 is inside a garage 90 as illustrated in FIG. 2, for example, it may be determined that the vehicle 1 is in an enclosed environment. Further, according to the present example embodiment, when the vehicle 1 is in an underground parking space 91 as illustrated in FIG. 2, it may be determined that the vehicle 1 is in an enclosed environment even if the underground parking space 91 is not a completely confined space, because there is a possibility that gas will adversely affect an occupant in the vehicle 1 or a person present in the underground parking space 91 depending on the type or volume of the gas.

Figure 3:
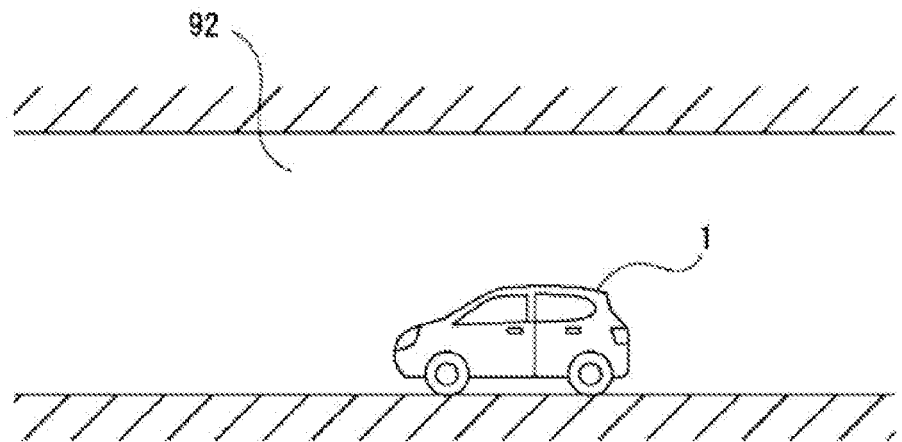
FIG. 3 is a diagram illustrating an example of an enclosed environment.

FIG. 3 illustrates the vehicle 1 stopping or traveling slowly inside a tunnel 92 due to traffic congestion. The tunnel 92 is not a completely confined space; however, it may be determined that the vehicle 1 stopping or substantially stopping inside the tunnel 92 is in an enclosed environment. Note that different tunnels have different ventilation structures. Thus, when the vehicle 1 is stopping or substantially stopping inside the tunnel 92 having a ventilation structure effectively functioning, it may be determined based on the position information and the communication with the external information server that the vehicle 1 is not in an enclosed environment.

Figure 4:
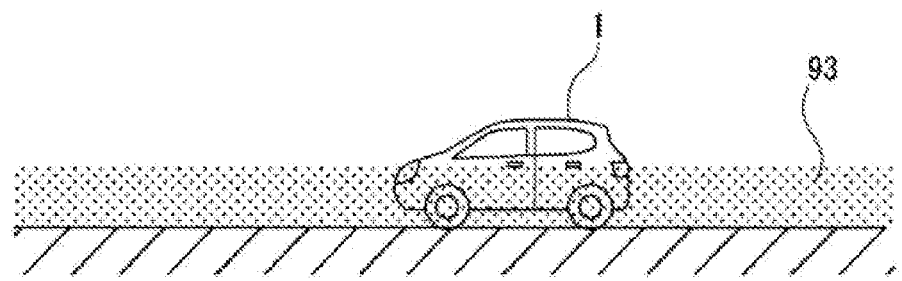
FIG. 4 is a diagram illustrating an example of an enclosed environment.

FIG. 4 illustrates the vehicle 1 a lower peripheral part of which is covered with snow 93. For example, a peripheral part or a part in the vicinity of the muffler of the vehicle 1 can be covered with the snow 93, and the external air introduction port of the A/C system can be occluded by the snow 93. In such a case, it may be determined that the vehicle 1 is in an enclosed environment when the amount of the snow 93 is greater than or equal to a predetermined amount.

The maintaining control processor 20 may determine whether the vehicle is in an enclosed environment as described above. When determining that the vehicle 1 is in an enclosed environment, the maintaining control processor 20 may perform predetermined maintaining control based on determinations regarding various conditions. Now, descriptions are given of exemplary processing to be performed by the maintaining control processor 20 in a case where the vehicle 1 is an engine vehicle, in a case where the vehicle 1 is an HEV provided with a battery disposed inside the vehicle 1 (hereinafter referred to as an in-vehicle battery), and in a case where the vehicle 1 is a vehicle provided with a battery disposed on the exterior of the vehicle 1 (hereinafter referred to as an outside-vehicle battery).

Figure 5:
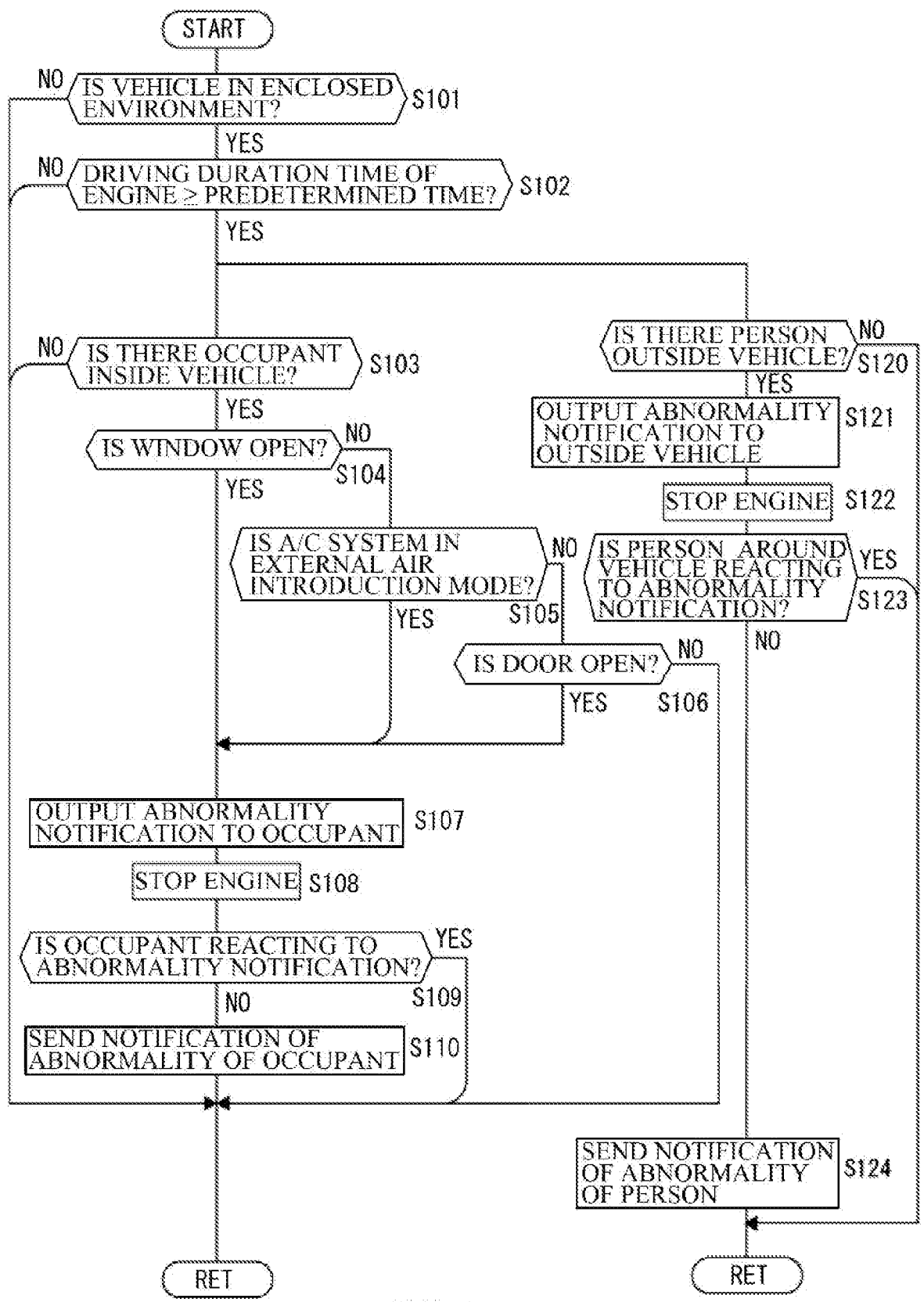
FIG. 5 is a flowchart of exemplary processing according to one example embodiment to be performed in an engine vehicle.

First, a description is given, with reference to FIG. 5, of exemplary processing to be performed by the maintaining control processor 20 in a case where the vehicle 1 is an engine vehicle. The maintaining control processor 20 may repeat the processing illustrated in FIG. 5 continuously or intermittently.

In Step S101, the maintaining control processor 20 may determine whether the vehicle 1 (an own vehicle) is in an enclosed environment now.

To make the determination, the maintaining control processor 20 may use the information, acquired by the position information processor 8, on the position of the vehicle and the region that the position of the vehicle 1 belongs to, and the image, captured by the outside-vehicle sensor unit 12, of the surrounding environment of the vehicle 1. For example, the maintaining control processor 20 may be configured to determine based on the information acquired by the position information processor 8 that the current position of the vehicle 1 is in the tunnel 92 or a home parking space. Further, the maintaining control processor 20 may be configured to determine that the current position of the vehicle 1 is in the garage 90 or the underground parking space 91 that is an enclosed space by analyzing the image captured by the outside-vehicle sensor unit 12. Furthermore, the maintaining control processor 20 may be configured to determine the condition of the snow 93.

The maintaining control processor 20 may determine whether the vehicle 1 is in the enclosed environment based on the information on the position of the vehicle 1 and the captured image. Alternatively, the maintaining control processor 20 may determine whether the vehicle 1 is in an enclosed environment by detecting an obstacle present around the vehicle 1 based on information acquired by a millimeter-wave radar or a LiDAR, for example. Further, the maintaining control processor 20 may also use auxiliary information such as temperature information and weather information. In addition, the maintaining control processor 20 may be configured to determine whether the vehicle 1 is traveling. When using the image captured by the camera, the maintaining control processor 20 may determine a current environment based on an image captured on the way to the current position of the vehicle 1 as auxiliary information as well as the image currently captured.

In this example embodiment, the maintaining control processor 20 may determine whether the vehicle 1 is in an enclosed environment based on the information acquired by the position information processor 8 or the information acquired by the outside-vehicle sensor unit 12. However, in order to improve determination accuracy, the determination may be made comprehensively based on multiple pieces of information.

When determining that the vehicle 1 is not in an enclosed environment (Step S101: NO), the maintaining control processor 20 may cause the processing in FIG. 5 to return, and the determination as to whether the vehicle is in an enclosed environment in Step S101 may be repeated. In contrast, when determining that the vehicle 1 is in an enclosed environment (Step S101: YES), the maintaining control processor 20 may cause the processing to proceed to Step S102.

In Step S102, the maintaining control processor 20 may determine whether the engine has been driven for a predetermined time or longer based on the information on a driving state of the engine detected by the power source sensor unit 10. The predetermined time may be a threshold time based on which the determination is made as to whether the engine has been continuously driven in the enclosed environment. For example, the driving duration time of the engine may be counted from a time when the vehicle is determined for the first time to be in the enclosed environment. If it is determined that the vehicle is no longer in the enclosed environment (that is, if it is determined that the vehicle 1 has exited the enclosed environment) at a certain subsequent time in Step S101, the counting of the driving duration time of the engine may be reset. The driving duration time of the engine may be compared with the predetermined time that is the threshold time for the determination described above. If the maintaining control processor 20 determines that the engine has been stopped or that the engine has been driven but the predetermined time has not elapsed (Step S102: NO), the maintaining control processor 20 may end a first cycle of the processing in FIG. 5 and may cause the processing to return.

If it is determined that the engine has been driven for the predetermined time or longer (Step S102: YES), the maintaining control processor 20 may execute a process regarding the inside of the vehicle 1 that involves Step S103 to Step S110, and a process regarding the outside of the vehicle 1 that involves Step S120 to Step S124. For convenience of illustration and description, Step S103 and the subsequent steps are illustrated in parallel to Step S120 and the subsequent steps. However, the process regarding the inside of the vehicle 1 and the process regarding the outside of the vehicle 1 may be performed in parallel at the same time or may be performed in a time series manner in any order.

First, a description is given of the process regarding the inside of the vehicle 1. In Step S103, the maintaining control processor 20 may determine whether there is an occupant inside the vehicle 1. For example, the maintaining control processor 20 may determine whether there is an occupant inside the vehicle 1 by analyzing the image of the interior of the vehicle 1 captured by the inside-vehicle sensor unit 11 or based on the detection information acquired by the weight sensor or the other sensors of the inside-vehicle sensor unit 11.

If it is determined in Step S103 that there is no occupant inside the vehicle 1 (Step S103: NO), the process regarding the inside of the vehicle 1 may end. If it is determined in Step S103 that there is an occupant inside the vehicle 1 (Step S103: YES), the maintaining control processor 20 may determine a ventilation condition inside the vehicle 1 in Steps S104, S105, and S106. For example, the maintaining control processor 20 may determine in Step S104 whether a window of the vehicle 1 is open. The maintaining control processor 20 may further determine in Step S105 whether the A/C system of the vehicle 1 is in the external air introduction mode. The maintaining control processor 20 may further determine in Step S106 whether a door of the vehicle 1 is open.

If all of the results of determinations in Steps S104, S105, and S106 are "NO", that is, if the interior of the vehicle 1 is determined to be a confined space, the maintaining control processor 20 may end the process regarding the inside of the vehicle 1 because the exhaust gas discharged from the engine will not enter inside the vehicle 1.

In contrast, if any of the results of determinations in Steps S104, S105, and S106 is "YES", there is a possibility that the exhaust gas discharged from the engine will enter inside the vehicle 1. Accordingly, the maintaining control processor 20 may cause the processing to proceed to Step S107 in which the notification unit 14 outputs an abnormality notification to the occupant. For example, the notification unit 14 may output an alert in the form of a displayed image, a sound, or a voice notifying the occupant of the condition that can adversely affect the occupant. The alert may be outputted in the form of: a warning image; a warning sound; or a sound, a voice, or a displayed image representing a warning message such as "Watch out for carbon monoxide poisoning." or "Check the exhaust pipe for snow.", for example.

In Step S108, the maintaining control processor 20 may send the engine control processor 3 a command to stop the engine to thereby stop the engine from driving.

In Step S109, the maintaining control processor 20 may determine based on the information received from the inside-vehicle sensor unit 11 whether the occupant is reacting to the abnormality notification. For example, the maintaining control processor 20 may determine whether the occupant is appropriately reacting to the abnormality notification by analyzing the captured image or based on a change in the detection information received from the weight sensor, for example. For instance, the maintaining control processor 20 may determine whether the occupant has evacuated from the vehicle 1. The maintaining control processor 20 may determine that the occupant is appropriately reacting to the abnormality notification when air ventilation starts or when the vehicle 1 starts traveling (when the vehicle 1 exits the enclosed environment), for example. If it is determined that the occupant is appropriately reacting to the abnormality notification (Step S109: YES), the maintaining control processor 20 may end the process regarding the inside of the vehicle 1.

If it is determined that the person is not appropriately reacting to the abnormality notification (Step S109: NO), the maintaining control processor 20 may cause the processing to proceed to Step S110 in which the communicator 13 sends a notification of the abnormality of the occupant. For example, when it is determined in the determination in Step S109 that the occupant is in an unconscious condition or another adversely affected condition, the maintaining control processor 20 may cause the communicator 13 to send an emergency rescue request to an external facility such as a telematic service agency or a rescue organization in Step S110. In this case, the information including the position of the vehicle 1, the state of the occupant, and the type of the adverse effect may be sent together with the emergency rescue request to help the rescue organization recognize the situation.

Next, a description is given of the process regarding the outside of the vehicle 1. When determining that the engine has been driven in the enclosed environment for the predetermined time or longer (Step S102: YES), the maintaining control processor 20 may execute the process regarding the outside of the vehicle that involves Step S120 and the subsequent steps as well as the process regarding the inside of the vehicle 1.

In Step S120, the maintaining control processor 20 may determine whether there is a person outside the vehicle 1. Because the determination in Step S120 is made after it is determined in Step S101 that the vehicle 1 is in the enclosed environment, the determination in Step S120 may be a determination as to whether there is a person in the enclosed environment space. That is, in Step S120, a determination may be made as to whether there is a person around the vehicle. For example, the maintaining control processor 20 may determine whether there is a person around the vehicle 1 by analyzing the image of the surrounding environment of the vehicle 1 captured by the outside-vehicle sensor unit 12 or based on the detection by a sensor such as a millimeter-wave radar.

If it is determined that there is no person outside the vehicle 1 (Step S120: NO), the process regarding the outside of the vehicle 1 may end. If it is determined that there is a person outside the vehicle 1 (Step S120: YES), the maintaining control processor 20 may cause the notification unit 14 to output an abnormality notification to outside the vehicle 1 in Step S121. For example, the maintaining control processor 20 may cause the notification unit 14 to output an alert notifying the person outside the vehicle 1 of the adversely affected condition. The alert may be in the form of a warning sound or a warning message, for example.

In Step S122, the maintaining control processor 20 may send the engine control processor 3 a command to stop the engine, to thereby stop the engine from driving.

In Step S123, the maintaining control processor 20 may determine based on the information received from the outside-vehicle sensor unit 12 whether the person present around the vehicle 1 is reacting to the abnormality notification. For example, the maintaining control processor 20 may determine whether the person present around the vehicle 1 is appropriately reacting to the abnormality notification by analyzing the captured image, for example. For instance, the maintaining control processor 20 may determine whether the person is moving away from the vehicle 1 in response to the abnormality notification. If it is determined that the person present around the vehicle 1 is appropriately reacting to the abnormality notification (Step S123: YES), the maintaining control processor 20 may end the process regarding the outside of the vehicle 1.

If it is determined that the person around the vehicle 1 is not appropriately reacting to the abnormality notification (Step S123: NO), the maintaining control processor 20 may cause the processing to proceed to Step S124 in which the communicator 13 sends a notification of the abnormality of the person. For example, when it is determined in Step S123 that the person present around the vehicle 1 is in an adversely affected condition, the maintaining control processor 20 may cause the communicator 13 to send an emergency rescue request to the external facility such as a telematic service agency or a rescue organization in Step S124. In this case, the information including the position of the vehicle 1, the state of the person present around the vehicle 1, and the type of the adverse effect may be sent together with the emergency rescue request to help the rescue organization recognize the situation.

Figure 6:
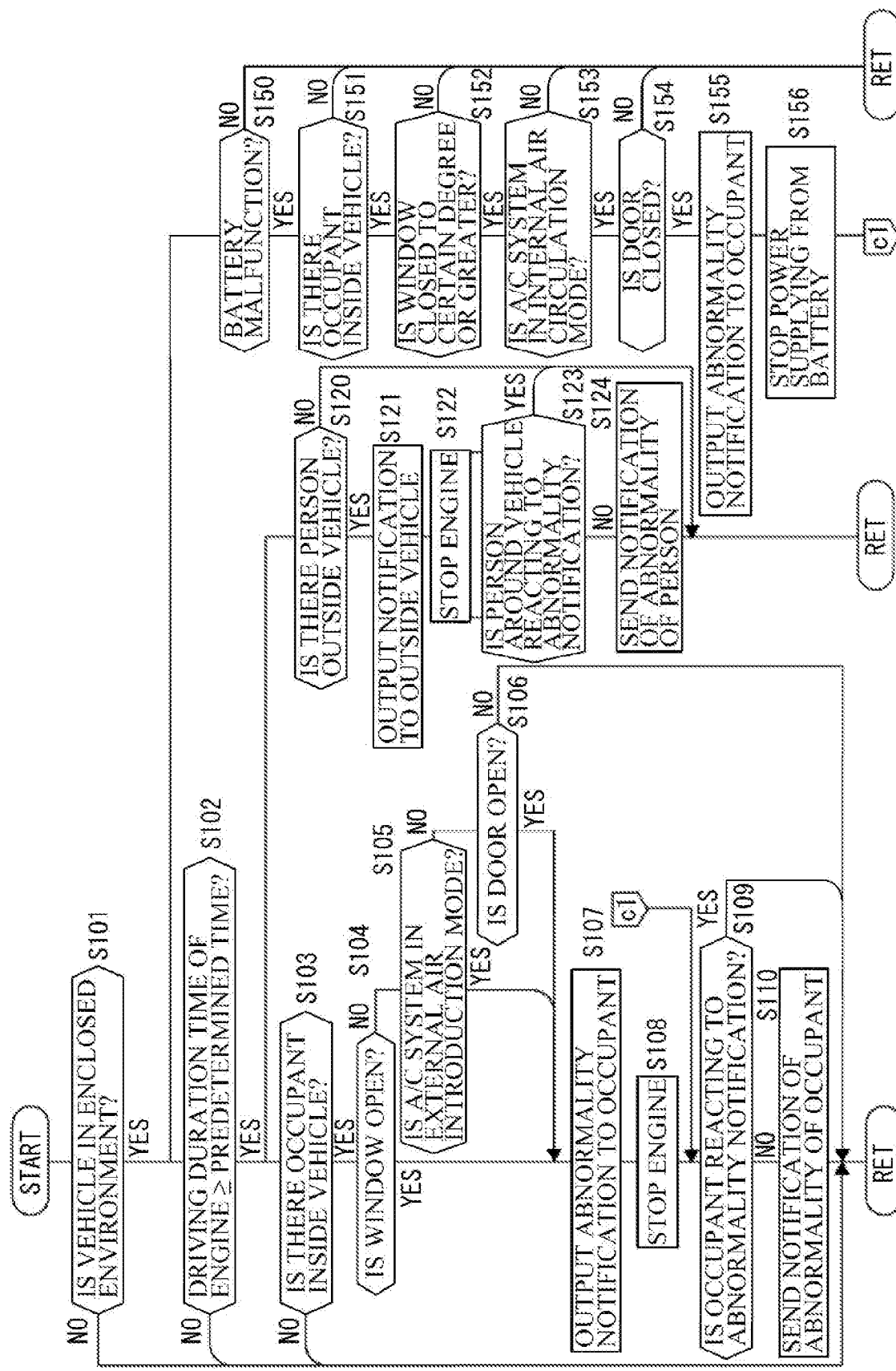
FIG. 6 is a flowchart of exemplary processing according to one example embodiment to be performed in a hybrid vehicle provided with an in-vehicle battery.

Next, a description is given, with reference to FIG. 6, of exemplary processing to be performed by the maintaining control processor 20 in a case where the vehicle 1 is an HEV including an in-vehicle battery. In FIG. 6, steps similar to those in FIG. 5 are denoted by the same step numbers and detailed descriptions thereof are omitted without redundant description.

The maintaining control processor 20 may repeat the processing illustrated in FIG. 6 continuously or intermittently. In Step S101, the maintaining control processor 20 may determine whether the vehicle 1 is in an enclosed environment now. When determining that the vehicle 1 is not in an enclosed environment (Step S101: NO), the maintaining control processor 20 may cause the processing in FIG. 6 to return, and the determination as to whether the vehicle 1 is in an enclosed environment in Step S101 may be repeated.

In contrast, when determining that the vehicle 1 is in an enclosed environment (Step S101: YES), the maintaining control processor 20 may execute an engine-related process that involves Step S102 to Step S124, and a battery-related process that involves Step S150 to Step S156. For convenience of illustrating and description, Step S102 and the subsequent steps are illustrated in parallel to Step S150 and the subsequent steps. However, the engine-related process and the battery-related process may be performed in parallel at the same time or may be performed in a time series manner in any order.

The engine-related process that involves Step S102 to Step S124 may be similar to that illustrated in FIG. 5. That is, the maintaining control processor 20 may determine in Step S102 whether the engine has been driven for the predetermined time or longer. If it is determined that the engine has been driven for the predetermined time or longer (Step S102: YES), the maintaining control processor 20 may execute the process regarding the inside of the vehicle 1 that involves Step S103 to Step S110 and the process regarding the outside of the vehicle 1 that involves Step S120 to Step S124 as described above with reference to FIG. 5.

Now, a description is given of the battery-related process. In Step S150, the maintaining control processor 20 may determine whether a malfunction of the battery has been detected. For example, the maintaining control processor 20 may determine based on the detection information received from the power source sensor unit 10 whether a battery temperature is abnormal, whether a battery charged voltage is abnormal, whether a voltage difference between battery blocks is abnormal, or whether a motor driving current value is abnormal.

If it is determined in Step S150 that no malfunction of the battery has been detected (Step S150: NO), the battery-related process may end. If it is determined in Step S150 that a malfunction of the battery has been detected (Step S150: YES), the maintaining control processor 20 may determine in Step S151 whether there is an occupant inside the vehicle 1.

If it is determined in Step S151 that there is an occupant inside the vehicle 1 (Step S151: YES), the maintaining control processor 20 may determine a ventilation condition inside the vehicle 1 in Steps S152, S153, and S154. In Step S152, the maintaining control processor 20 may determine whether a window of the vehicle 1 is closed to a certain degree or greater. For example, the maintaining control processor 20 may determine whether a window of the vehicle 1 is more than half closed or more than three-quarters closed. That is, the degree of airtightness inside the vehicle 1 may be determined in Step S152. In Step S153, the maintaining control processor 20 may determine whether the A/C system is in the internal air circulation mode. In Step S154, the maintaining control processor 20 may determine whether a door of the vehicle 1 is closed.

If all of the results of the determinations in Steps S152, S153, and S154 are "NO", it may be determined that the interior of the vehicle 1 is not a confined space. In this case, the maintaining control processor 20 may end the battery-related process.

In contrast, if all of the results of the determinations in Steps S152, S153, and S154 are "YES", it may be determined that the interior of the vehicle 1 is a confined space (or a substantially confined space). In this case, there is a possibility that the interior of the vehicle 1 will be filled with gas generated due to the battery malfunction. Accordingly, the maintaining control processor 20 may cause the processing to proceed to Step S155 in which the notification unit 14 outputs an abnormality notification to the occupant. For example, the notification unit 14 may output an alert in the form of a displayed image, a sound, or a voice notifying the occupant of the condition that can adversely affect the occupant. The alert may be outputted in the form of: a warning image; a warning sound; or a sound, a voice, or a displayed image representing a warning message such as "Watch out for carbon monoxide poisoning." or "Exit the vehicle.", for example.

In Step S156, the maintaining control processor 20 may send the motor control processor 4 a command to stop the battery from supplying electric power, to thereby stop the battery from supplying electric power.

Thereafter, the maintaining control processor 20 may cause the processing to proceed to Step S109 in which whether the occupant inside the vehicle 1 is reacting to the abnormality notification. In Step S110, the maintaining control processor 20 may perform a process of sending, for example, an emergency rescue request to the external facility.

Figure 7:
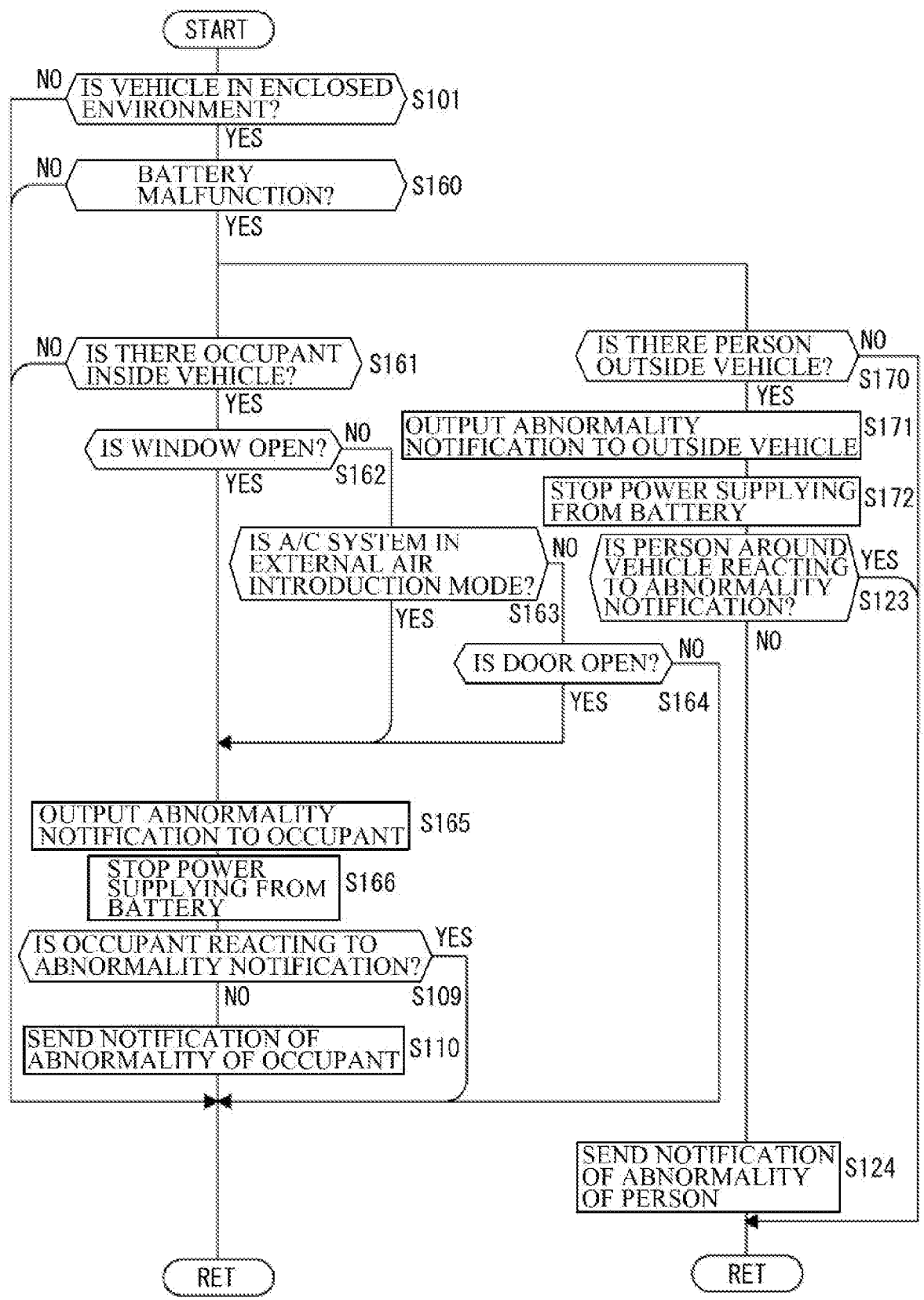
FIG. 7 is a flowchart of exemplary processing according to one example embodiment to be performed in an electric vehicle provided with an outside-vehicle battery or a fuel cell electric vehicle.

Next, a description is given, with reference to FIG. 7, of exemplary processing to be performed by the maintaining control processor 20 in a case where the vehicle 1 is an electric vehicle provided with an outside-vehicle battery disposed, for example, below the floor of the vehicle 1, or a fuel cell electric vehicle. In FIG. 7, steps similar to those in FIG. 5 are denoted by the same step numbers and detailed descriptions thereof are omitted without redundant description.

The maintaining control processor 20 may repeat the processing illustrated in FIG. 7 continuously or intermittently. In Step S101, the maintaining control processor 20 may determine whether the vehicle 1 is in the enclosed environment now. When determining that the vehicle 1 is not in the enclosed environment (Step S101: NO), the maintaining control processor 20 may cause the processing in FIG. 7 to return, and the determination as to whether the vehicle 1 is in an enclosed environment in Step S101 may be repeated.

In contrast, when determining that the vehicle 1 is in the enclosed environment (Step S101: YES), the maintaining control processor 20 may determine in Step S160 whether a battery malfunction has been detected. The term "battery malfunction" used herein refers to a malfunction of the outside-vehicle battery, a malfunction of a fuel-cell system, or a malfunction of a hydrogen tank. The maintaining control processor 20 may determine whether the battery malfunction has been detected based on the detection information received from the power source sensor unit 10.

If it is determined in Step S160 that a battery malfunction has not been detected (Step S160: NO), the processing in FIG. 7 may return, and the maintaining control processor 20 may repeat the process in Step S101.

If it is determined in Step S160 that a battery malfunction has been detected in the enclosed environment (Step S160: YES), the maintaining control processor 20 may perform the process regarding the inside of the vehicle 1 that involves Step S161 to Step S110, and the process regarding the outside of the vehicle 1 that involves Step S170 to Step S124. For convenience of illustrating and description, the process regarding the inside of the vehicle 1 and the process regarding the outside of the vehicle 1 are illustrated in parallel to each other. However, these processes may be performed in parallel at the same time or may be performed in a time series manner in any order.

Now, a description is given of the process regarding the inside of the vehicle 1. In Step S161, the maintaining control processor 20 may determine whether there is an occupant inside the vehicle 1. If it is determined in Step S161 that there is no occupant inside the vehicle 1 (Step S161: NO), the process regarding the inside of the vehicle 1 may end.

If it is determined in Step S161 that there is an occupant inside the vehicle 1 (Step S161: YES), the maintaining control processor 20 may determine a ventilation condition inside the vehicle 1 in Steps S162, S163, and S164. For example, the maintaining control processor 20 may determine in Step S162 whether a window of the vehicle 1 is open. The maintaining control processor 20 may further determine in Step S163 whether the A/C system of the vehicle 1 is in the external air introduction mode. The maintaining control processor 20 may further determine in Step S164 whether a door of the vehicle 1 is open.

If all of the results of determinations in Steps S162, S163, and S164 are "NO", that is, if the interior of the vehicle 1 is determined to be a confined space, the maintaining control processor 20 may end the process regarding the inside of the vehicle 1 because gas generated due to the battery malfunction will not enter inside the vehicle 1.

In contrast, if any of the results of determinations in Steps S162, S163, and S164 is "YES", there is a possibility that gas generated due to the battery malfunction will enter inside the vehicle 1. Accordingly, the maintaining control processor 20 may cause the processing to proceed to Step S165 in which the notification unit 14 outputs an abnormality notification to the occupant. For example, the notification unit 14 may output an alert in the form of a displayed image, a sound, or a voice notifying the occupant of the condition that can adversely affect the occupant.

In Step S166, the maintaining control processor 20 may send the motor control processor 4 a command to stop power supplying from the battery, to thereby stop the power supplying from the battery.

Thereafter, the maintaining control processor 20 may determine in Step S109 whether the occupant in the vehicle 1 is reacting to the abnormality notification. Based on the result of the determination, the maintaining control processor 20 may perform a process of sending, for example, an emergency rescue request to the external facility in Step S110.

Now, a description is given of the process regarding the outside of the vehicle 1. If it is determined in Step S160 that a battery malfunction has been detected (Step S160: YES), the maintaining control processor 20 may execute the process regarding the outside of the vehicle 1 that involves Step S170 and the subsequent steps.

In Step S170, the maintaining control processor 20 may determine whether there is a person outside (around) the vehicle 1. If it is determined in Step S170 that there is no person outside the vehicle 1 (Step 170: NO), the maintaining control processor 20 may end the process regarding the outside of the vehicle 1. If it is determined in Step S170 that there is a person outside the vehicle 1 (Step S170: YES), the maintaining control processor 20 may cause the notification unit 14 to output an abnormality notification to outside the vehicle 1 in Step S171. For example, the notification unit 14 may output an alert in the form of a warning sound or a message notifying the person present outside the vehicle 1 of the condition that can adversely affect the person.

In Step S172, the maintaining control processor 20 may send the motor control processor 4 a command to stop power supplying from the battery, to thereby stop the power supplying from the battery.

Thereafter, in Step S123, the maintaining control processor 20 may determine based on the information received from the outside-vehicle sensor unit 12 whether the person present around the vehicle 1 is reacting to the abnormality notification. If it is determined in Step S123 that the person present around the vehicle 1 is not appropriately reacting to the abnormality notification (Step S123: NO), the maintaining control processor 20 may cause the processing to proceed to Step S124 in which the communicator 13 sends a notification of the abnormality of the person.

The maintaining control processor 20 of the vehicle 1 according to the example embodiment described above determines whether the entire or a part of the vehicle 1 is in an enclosed environment. If it is determined that the entire or a part of the vehicle 1 is in an enclosed environment, the maintaining control processor 20 executes the control to output an abnormality notification (abnormality notification control) based on the result of the power-source-state determination regarding a state of the power source of the vehicle 1 and the result of the presence determination as to whether there is a person inside or outside the vehicle 1. The vehicle 1 is able to determine by itself that the vehicle 1 is in an enclosed environment. Thus, it is possible to prevent a person inside or outside the vehicle 1 from inhaling gas regardless of the type of the gas, and to notify the person of the condition that can adversely affect the person. This eliminates the necessity of gas sensors to be mounted corresponding to the types of gases that can be generated.

In the foregoing example embodiment, the maintaining control processor 20 may execute the control to stop the power source as well as the abnormality notification control. For example, when it is determined that the engine of an engine-mounted vehicle has been driven for the predetermined time or longer in the enclosed environment, the engine may be turned off (Steps S108 and S122). When it is determined that a battery malfunction has been detected in an HEV vehicle, an electric vehicle, or a fuel cell electric vehicle, the control to stop the power source may be executed (Steps S156, S166, and S172). Accordingly, even if gas is generated, it is possible to prevent the gas from progressing.

In the foregoing example embodiment, the maintaining control processor 20 may execute the control to output the abnormality notification to inside the vehicle 1 when it is determined that there is an occupant inside the vehicle 1 and that there is a possibility that gas generated from the power source will enter inside the vehicle 1 based on the results of the power-source-state determination regarding the power source state, the presence determination as to whether there is an occupant inside the vehicle 1, and the determination regarding the ventilation condition inside the vehicle compartment (Steps S107, S155, and S165). For example, the maintaining control processor 20 may execute the control to output the abnormality notification to inside the vehicle 1:
  when there is a possibility that exhaust gas generated by engine driving will enter inside the vehicle 1 through a window, a door, or the external air introduction port that is open;
  when there is a possibility that the interior of the vehicle 1 provided with an in-vehicle battery will be filled with gas generated due to a battery malfunction while the windows, the doors, and the external air introduction port are closed; or
  when there is a possibility that gas generated due to a battery malfunction will enter inside the vehicle 1 provided with an outside-vehicle battery through a window, a door, or the external air introduction port that is open. The maintaining control processor 20 makes it possible to notify the occupant inside the vehicle of the condition that can adversely affect the occupant by determining these situations and causing the abnormality notification to be outputted to inside the vehicle 1.

In the foregoing example embodiment, the abnormality notification may be outputted based on the result of the determination regarding the ventilation condition in the vehicle compartment (Steps S104, S105, and S106 or Steps S162, S163, and S164). However, the abnormality notification may be outputted to the occupant regardless of the ventilation condition to urge the occupant to take appropriate measure.

In the foregoing example embodiment, in a case where it is determined in the power-source-state determination and the presence determination that there is a person outside the vehicle 1 and that there is a possibility that gas generated from the power source will be discharged to outside the vehicle 1, the maintaining control processor 20 may execute the control to output the abnormality notification to outside the vehicle 1 (Steps S121 and S171). For example, the maintaining control processor 20 may execute the control to output the abnormality notification to outside the vehicle 1:
  when exhaust gas generated by engine driving is discharged; when there is a possibility that gas generated due to a battery malfunction will be discharged to outside the vehicle 1 provided with an in-vehicle battery through a window, a door, or the external air introduction port that is open; or
  when there is a possibility that gas will be generated due to a malfunction of an outside-vehicle battery of the vehicle 1. The maintaining control processor 20 makes it possible to notify the person present outside the vehicle and in an enclosed space of the condition that can adversely affect the person by determining these situations and causing the abnormality notification to be outputted to outside the vehicle 1.

In the foregoing example embodiment, the maintaining control processor 20 may execute, as the abnormality notification control, first abnormality notification control to output a first abnormality notification to inside or outside the vehicle (Steps S107, S155, S165, S121, and S171). Thereafter, if it is determined that an occupant inside the vehicle 1 or a person present outside the vehicle 1 is not reacting to the first abnormality notification, the maintaining control processor 20 may execute second abnormality notification control to output a second abnormality notification to the external facility via a radio communication (Steps S110 and S124). That is, when a movement of the occupant inside the vehicle is not detected after the abnormality notification is outputted to inside the vehicle, or when a movement of the person outside the vehicle is not detected after the abnormality notification is outputted to outside the vehicle, the abnormality notification may be sent to the external facility to request a rescue.

The maintaining control processor 20 in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the maintaining control processor 20 in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the maintaining control processor 20 in FIG. 1.

The invention claimed is:

1. A control apparatus to be mounted on a vehicle, the control apparatus comprising:
    one or more processors; and
    one or more memories storing commands for causing the one or more processors to:
        determine whether the vehicle is in an enclosed environment,
        in response to determining that the vehicle is in the enclosed environment, determine whether there is a person inside or outside the vehicle,
        in response to determining that there is a person inside the vehicle:
            (i) determine a ventilation condition inside the vehicle to determine whether an interior of the vehicle is a confined space, and
            (ii) in response to determining that the interior of the vehicle is not a confined space, execute abnormality notification control to output an abnormality notification to the person inside the vehicle based on a result of a power-source-state determination, the power-source-state determination comprising a determination regarding a state of a power source of the vehicle, and
        in response to determining that there is a person outside the vehicle, execute the abnormality notification control to output the abnormality notification to the person outside the vehicle based on the result of the power-source-state determination
    wherein execute the abnormality notification control to output the abnormality notification comprises: in response to determining that the power-source-state determination indicates an abnormality state of the power source of the vehicle, output the abnormality notification to the person inside or outside the vehicle.

2. The control apparatus according to claim 1, wherein the interior of the vehicle being not a confined space indicates a possibility that gas generated from the power source will enter inside the vehicle.

3. The control apparatus according to claim 1, wherein the abnormality notification control comprises:
    output the abnormality notification to the person outside the vehicle, in response to the result of the power-source-state determination indicating a possibility that gas generated from the power source will be discharged to outside the vehicle.

4. The control apparatus according to claim 1, wherein the interior of the vehicle is determined as not the confined space if at least one of the following is detected:
    (i) a window of the vehicle is open,
    (ii) an A/C system of the vehicle is in an external air introduction mode, or
    (iii) a door of the vehicle is open.

5. The control apparatus according to claim 1, wherein the power source of the vehicle is determined in the abnormality state if an engine of the vehicle has been driven for a predetermined time or longer.

6. The control apparatus according to claim 1, wherein the power source of the vehicle is determined in the abnormality state if a battery malfunction of the vehicle has been detected.

7. The control apparatus according to claim 1, wherein the one or more processors are further caused to execute control to stop the power source as well as the abnormality notification control.

8. The control apparatus according to claim 7, wherein the interior of the vehicle being not a confined space indicates a possibility that gas generated from the power source will enter inside the vehicle.

9. The control apparatus according to claim 7, wherein the abnormality notification control comprises:
    output the abnormality notification to the person outside the vehicle, in response to the result of the power-source-state determination indicating a possibility that gas generated from the power source will be discharged to outside the vehicle.

10. The control apparatus according to claim 7, wherein the one or more processors are further caused to:
    in response to determining that the person inside or outside the vehicle is not reacting to the abnormality notification, output a second abnormality notification to an external facility.

11. The control apparatus according to claim 10, wherein the second abnormality notification comprises a position of the vehicle and a state of the person.

12. The control apparatus according to claim 1, wherein the one or more processors are further caused to:
    in response to determining that the person inside or outside the vehicle is not reacting to the abnormality notification, output a second abnormality notification to an external facility.

13. The control apparatus according to claim 12, wherein the second abnormality notification comprises a position of the vehicle and a state of the person.

* * * * *